United States Patent
MacKenzie et al.

(10) Patent No.: US 7,155,242 B1
(45) Date of Patent: Dec. 26, 2006

(54) APPARATUS AND METHOD FOR MANIPULATING TRANSMISSION POWER IN A WIRELESS COMMUNICATION DEVICE

(75) Inventors: Andrew MacKenzie, Boronia (AU); Anthony Hunter, Wantirna (AU)

(73) Assignee: Good Technology, Inc., Santa Clara, CA (US)

( * ) Notice: Subject to any disclaimer, the term of this patent is extended or adjusted under 35 U.S.C. 154(b) by 637 days.

(21) Appl. No.: 10/112,626

(22) Filed: Mar. 29, 2002

(51) Int. Cl.
*H04Q 7/20* (2006.01)

(52) U.S. Cl. .......................... 455/466; 455/69

(58) Field of Classification Search ............ 455/69, 455/522, 574, 412.2, 423, 67.11, 67.13, 226.2, 455/226.3, 406, 456.2, 450, 127.2, 466
See application file for complete search history.

(56) References Cited

U.S. PATENT DOCUMENTS

| | | | |
|---|---|---|---|
| 5,960,327 A * | 9/1999 | Eaton et al. ............... | 340/7.37 |
| 6,571,084 B1 * | 5/2003 | Jabbary ....................... | 455/69 |
| 6,631,123 B1 * | 10/2003 | Jiang et al. ................. | 370/335 |
| 6,728,520 B1 * | 4/2004 | Coan et al. ................. | 455/126 |
| 2001/0023189 A1 * | 9/2001 | Kajimura ..................... | 455/522 |
| 2001/0044294 A1 * | 11/2001 | Khayrallah et al. ......... | 455/406 |

\* cited by examiner

*Primary Examiner*—Edward F. Urban
*Assistant Examiner*—Tu X. Nguyen
(74) *Attorney, Agent, or Firm*—Blakely, Sokoloff, Taylor & Zafman, LLP

(57) ABSTRACT

An apparatus and method are disclosed for improving signal transmission on a wireless device such as a personal digital assistant, wireless messaging device, or cellular phone. An initial transmission power level is selected based on received signal strength. If subsequent transmissions at the initial power level are unreliable, then the power is increased by a predetermined amount. Power level increases continue until signal transmission is reliable or the highest power level is reached. One embodiment of the system maintains its heightened power level across multiple communication dialogs.

13 Claims, 15 Drawing Sheets

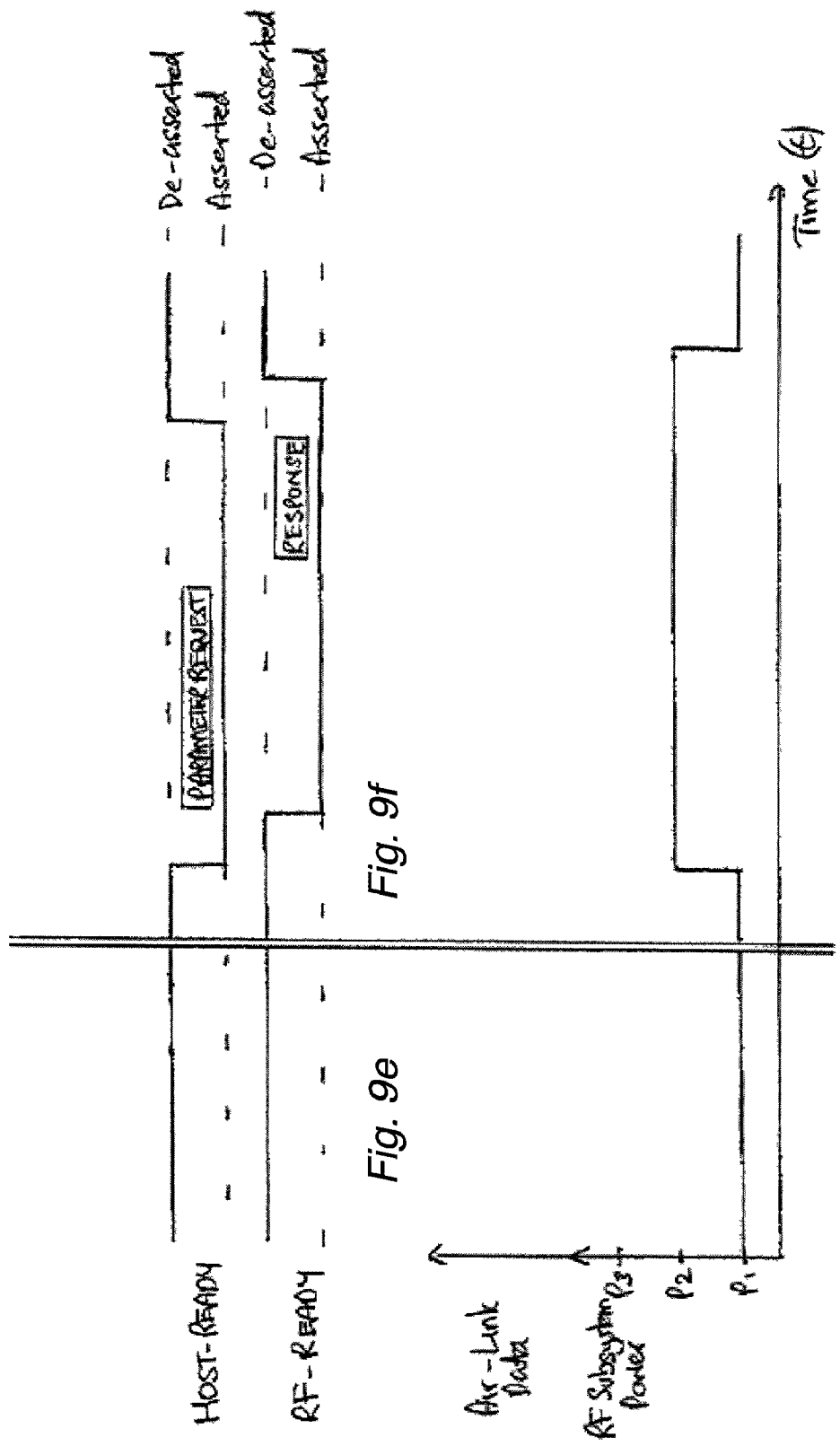

APPARATUS AND METHOD FOR MANIPULATING TRANSMISSION POWER IN A WIRELESS COMMUNICATION DEVICE

BACKGROUND

1. Field of the Invention

This invention relates generally to the field of wireless data systems. More particularly, the invention relates to an apparatus and method for improving the transmission capabilities of a wireless device by manipulating the power level at which the device transmits data.

2. Description of the Related Art

A variety of wireless data processing devices have been introduced over the past several years. These include wireless personal digital assistants ("PDAs") such as the Palm® VIIx handheld, cellular phones equipped with data processing capabilities, and, more recently, corporate wireless messaging devices such as the Blackberry™ wireless pager developed by Research In Motion ("RIM").™

Many of these wireless devices are capable of transmitting data (as well as audio signals) at two or more discrete power levels. The specific power level selected is generally directly related to the received signal strength indication ("RSSI") at the device. Thus, referring to FIG. 1, as the received signal strength increases, the power level at which the device transmits decreases in a step-wise manner. For example, when the received signal strength is between 0 and $RSS_1$, the wireless device transmits at its highest power level, $P_3$. Similarly, when the received signal strength is above some maximum value, $RSS_2$, the wireless device transmits at its lowest power level $P_1$. This fixed relationship is based on the assumption that if the energy of the signal transmitted from the base station is relatively low, then the wireless device must be relatively far away from the base station and, therefore, must transmit at a relatively high power level for its signal to successfully reach the base station. Of course, variables other than distance between the device and the base station may affect signal strength. However, the assumption is that these variables will affect the transmitted signal and the received signal equally.

One problem which exists with the foregoing configuration is that devices are incapable of deviating from the direct relationship between RSSI and the transmission power level. Accordingly, once a device selects a particular power level at which to transmit based on RSSI, it does not increase its power level in the event of a series of unsuccessful transmissions. It also does not decrease the power level in the event that selected power level is unnecessarily high.

Many wireless devices are also capable of entering a low power mode (commonly referred to as a "sleep" or "standby" mode) in which they consume substantially less power than during normal operation, thereby prolonging battery life. However, these power management techniques are overly simplistic and inefficient in certain circumstances. For example, in wireless device with dual processors (e.g., a baseband processor and a CPU), prior power management techniques do not allow each processor to be powered down independently of one another.

Accordingly, what is needed is a more efficient and flexible power selection scheme. What is also needed is a more intelligent, efficient power management system whereby selected logical portions of the wireless device (e.g., a single processor in a dual processor system) can operate at a low power level while the remaining logical portions operate at a standard power level. What is also needed is a power management system which is backwards-compatible with current power management protocols (e.g., Mobitex).

SUMMARY

An apparatus and method are disclosed for improving signal transmission on a wireless device such as a personal digital assistant, wireless messaging device, or cellular phone. An initial transmission power level is selected based on received signal strength. If subsequent transmissions at the initial power level are unreliable, then the power is increased by a predetermined amount. Power level increases continue until signal transmission is reliable or the highest power level is reached. One embodiment of the system maintains its heightened power level across multiple communication dialogs.

BRIEF DESCRIPTION OF THE DRAWINGS

A better understanding of the present invention can be obtained from the following detailed description in conjunction with the following drawings, in which:

FIGS. 9a-k illustrate plots of power consumed by various embodiments of the wireless device as a function of time.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 2:
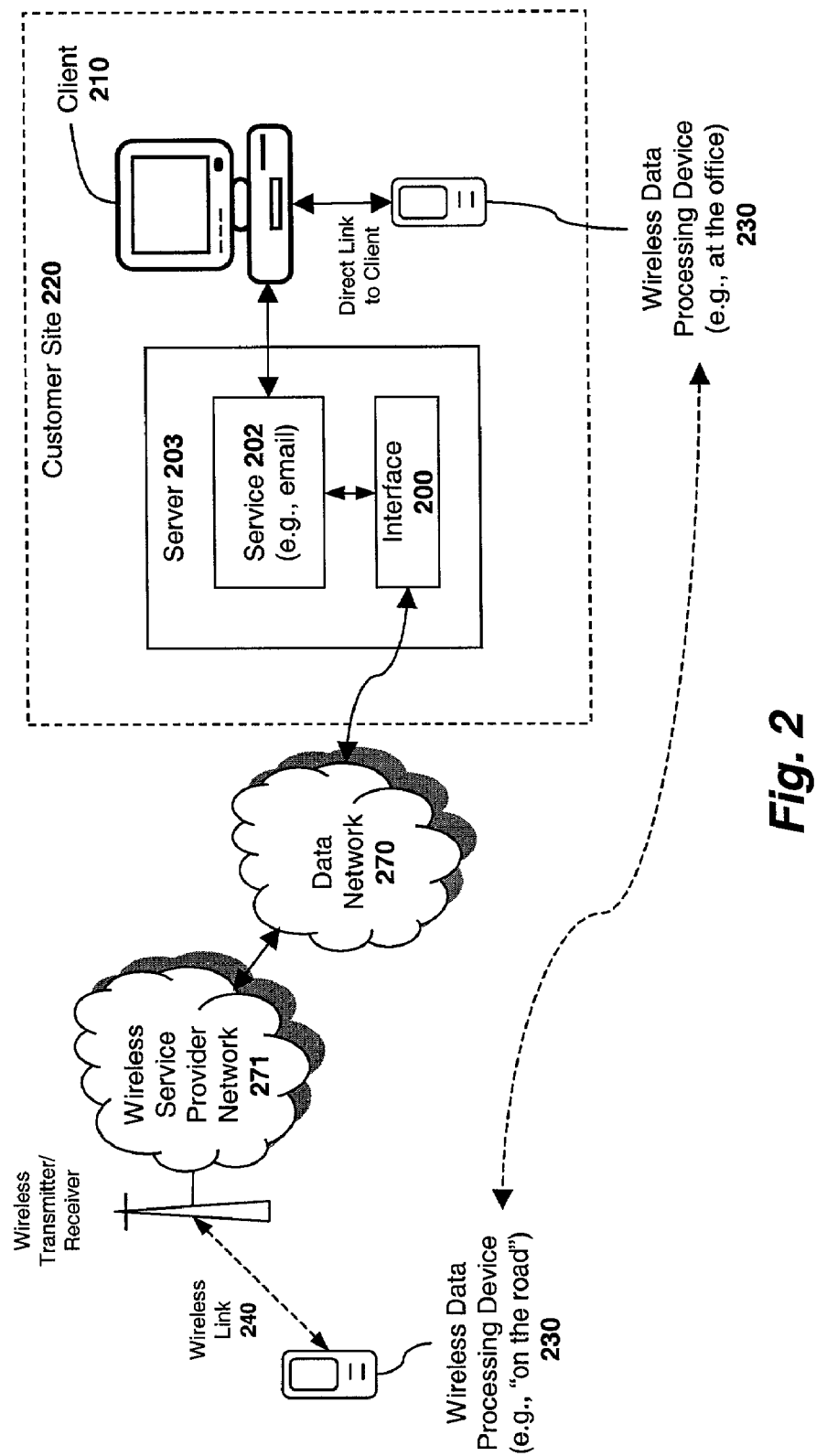
FIG. 2 illustrates an exemplary network architecture on which embodiments of the invention may be implemented.

FIG. 2 illustrates a network architecture in which one embodiment of the wireless device operates. It should be noted, however, that many of the specific details set forth in FIG. 2 are not required for implementing the underlying principles of the invention.

The "customer site" 220 illustrated in FIG. 2 may be any local-area or wide-area network over which a plurality of servers 203 and clients 210 communicate. For example, the customer site may include all servers and clients maintained by a single corporation. The servers 203 may be configured to provide a variety of different messaging and groupware services 202 to network users (e.g., email, instant messaging, calendaring, . . . etc). In one embodiment, these services are provided by Microsoft Exchange.™ However, the underlying principles of the invention are not limited to any particular messaging/groupware platform.

Figure 1:
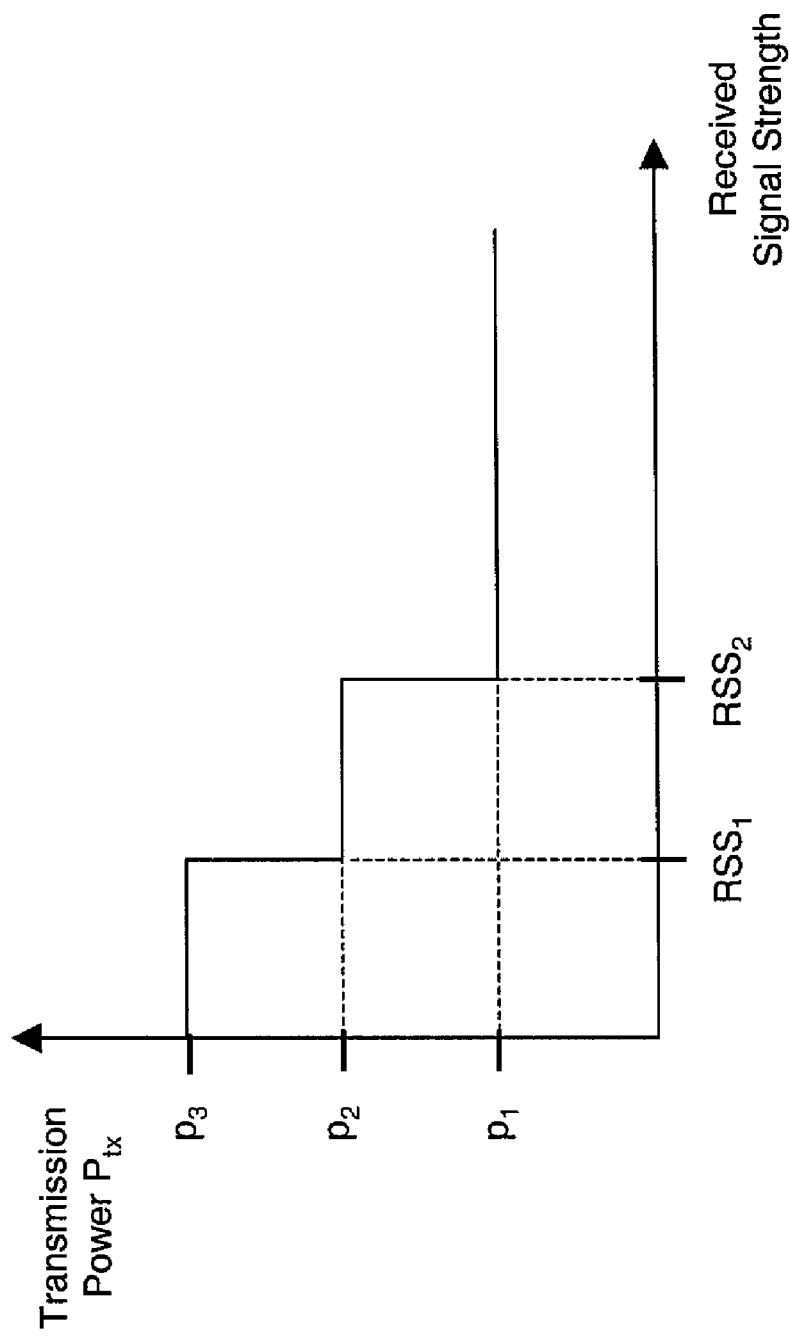
FIG. 1 illustrates the relationship between received signal strength and power level for a typical wireless device.

In one embodiment of the invention, an interface 200 forwards data maintained by the service 202 (e.g., email messages, instant messages, calendar data, . . . etc) to wireless data processing devices (represented in FIG. 1 by wireless device 230) via an external data network 270 and/or a wireless service provider network 271. For example, if the service 202 includes an email database, the interface 200 forwards any new emails which arrive in a user's mailbox on the service 202 to the user's wireless data processing device 230 (over the network(s) 270 and/or 271). Alternatively, or in addition, the service 202 may forward the email to the user's local computer (e.g., client 210) (i.e., so that the user will receive the email on his/her wireless device 230 when out of the office and on his/her personal computer 210 when in the office). Conversely, email messages sent from the user's wireless data processing device 230 are transmitted to the service 202 via the interface 200.

In one embodiment, the external data network 270 is comprised of a plurality of servers/clients (not shown) and other networking hardware (e.g., routers, hubs, . . . etc) for forwarding data between the interface 200 and the wireless devices 230. In one embodiment, the interface 200 encapsulates data in one or more packets containing an address identifying the wireless devices 230 (e.g., such as a 24-bit Mobitex Access Number ("MAN #")). The external data network 270 forwards the packets to a wireless service provider network 271 which transmits the packets (or the data contained therein) over a wireless communication link to the wireless device 230. In one embodiment, the wireless service provider network is a packet-switched wireless data network employing the Mobitex protocol. However, various other network protocols may be employed (e.g., CDMA 2000, PCS . . . etc) while still complying with the underlying principles of the invention.

Wireless Device Architecture

An exemplary wireless device architecture will now be described with respect to FIG. 3. As illustrated, this embodiment is comprised generally of a Host subsystem 300 and an RF subsystem 301 which communicate via an interface 330. The Host subsystem 300 is comprised of a Host processor and memory 335 for executing program code and operating on data. For example, in one embodiment, the processor and memory 335 are responsible for running the wireless device's operating system, user interface and/or any applications installed on the device. In one embodiment, the Host processor is comprised of an ARM® core micro-controller (e.g., such as the L7210 from Linkup Systems which uses an ARM720T core). However, various other processors may be employed while still complying with the underlying principles of the invention. One embodiment of the Host subsystem 300 may also include a non-volatile memory (not shown), such as an EEPROM or Flash memory, for storing program code and data when the device is powered off.

Figure 3:
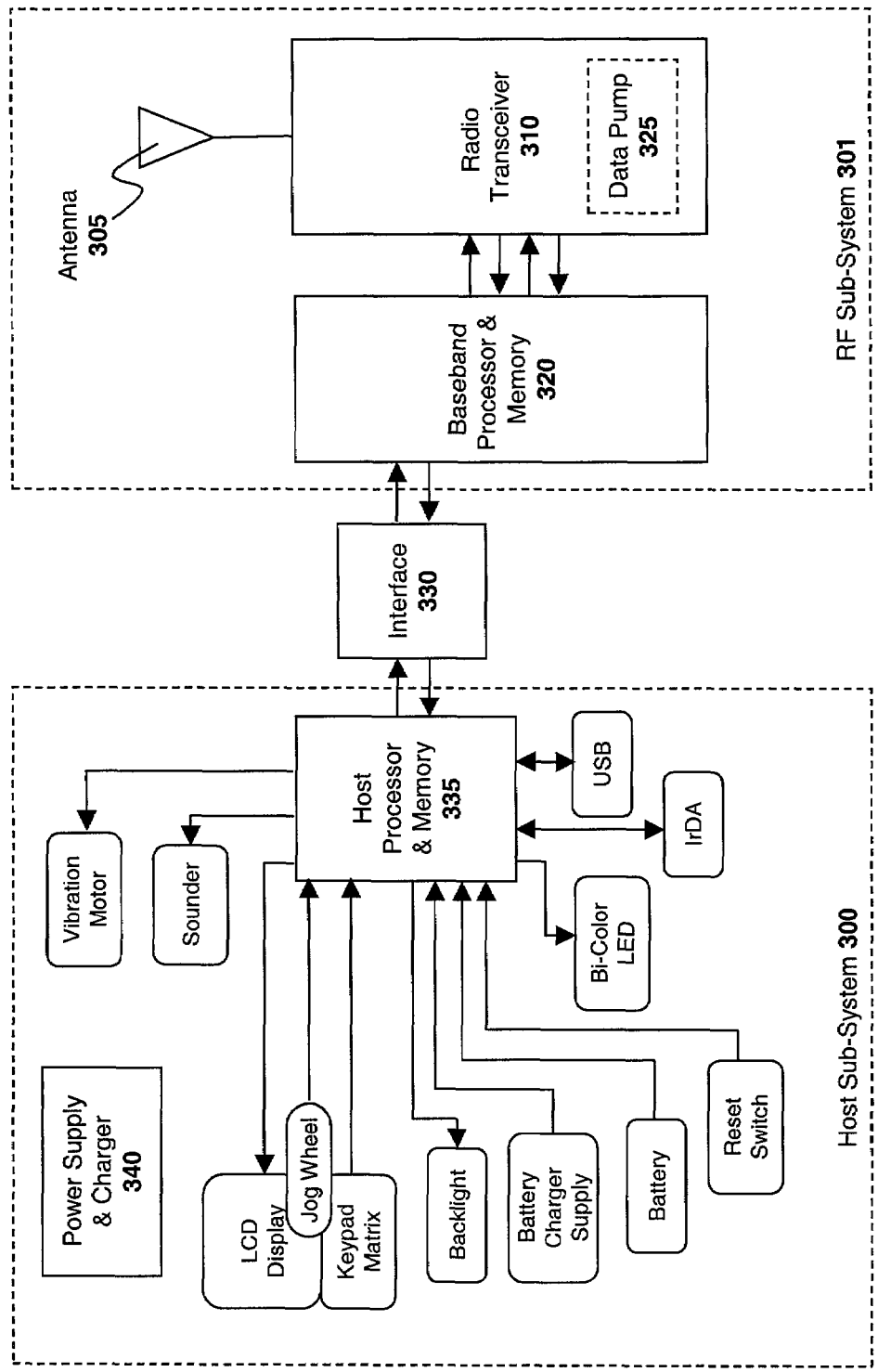
FIG. 3 illustrates an exemplary device architecture according to one embodiment of the invention.

As indicated in FIG. 3, the Host subsystem 300 may also include a power supply/charger unit 340 and various I/O and/or user interface elements 350 (e.g., an LCD display, a keypad, a USB port, an IrDA port, to name a few).

The RF subsystem 301 is responsible for transmitting and receiving data over the wireless network 271. Accordingly, one embodiment of the RF subsystem 301 is comprised of a baseband processor and memory 320 for implementing a particular network protocol supported by the network 271 (e.g., such as the Mobitex protocol). The power level adaptations described herein may be embodied in the protocol executed by the baseband processor, either alone or in addition to an existing protocol standard. In one embodiment, the baseband processor is the Z183 micro-controller manufactured by Zilog, Inc. However, the underlying principles of the invention are not limited to any particular baseband processor. The data pump 325 of one embodiment encodes/decode the transmitted/received signal according to the particular modulation techniques employed by the radio transceiver 310.

EMBODIMENTS OF THE INVENTION

Power Level Adjustment

One embodiment of the invention increases or decreases signal transmission power of the wireless device in a more intelligent manner than current wireless devices (i.e., which focus entirely on the RSSI value registered at the device).

Figure 4:
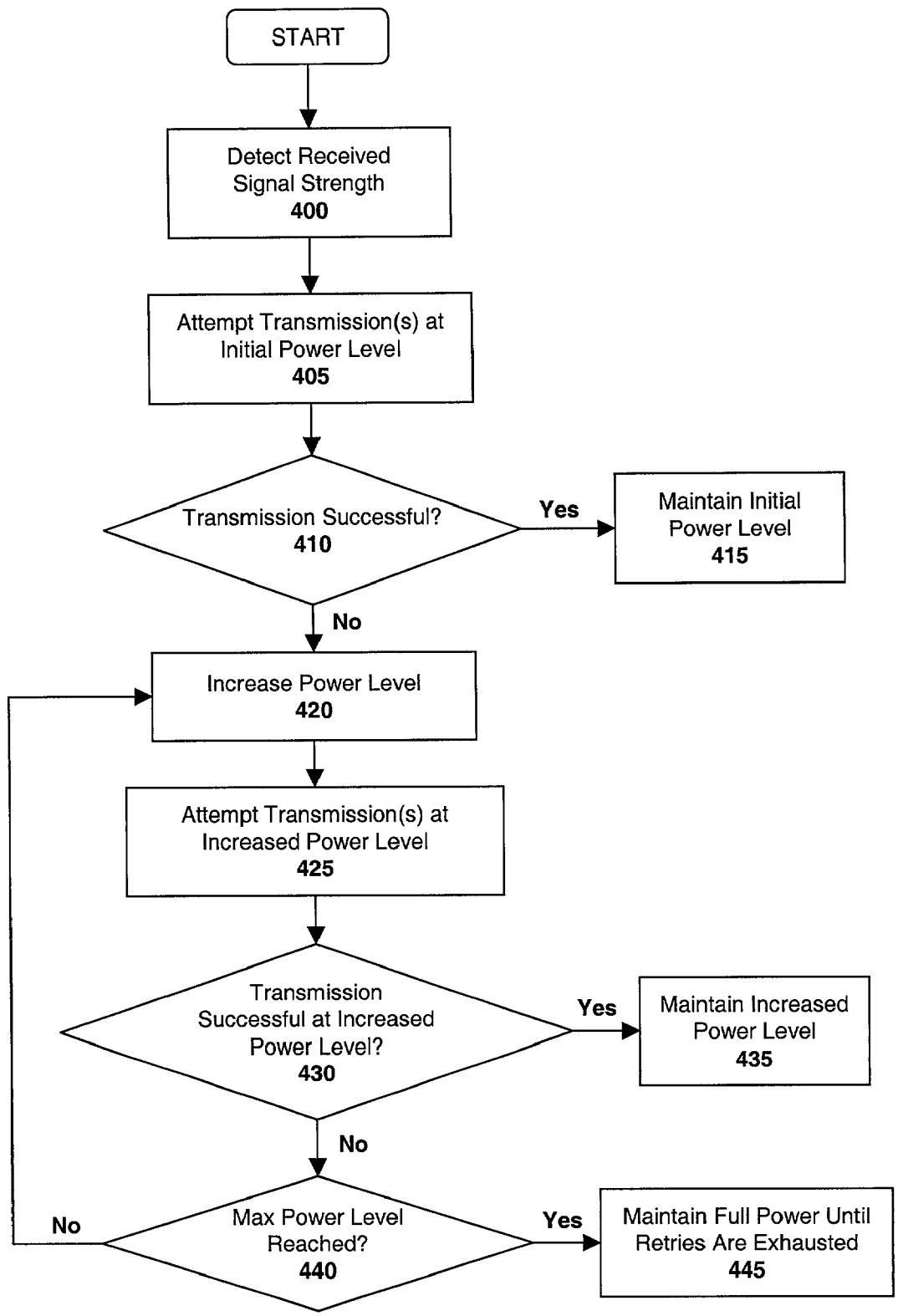
FIG. 4 illustrates a process for selecting a transmission power level according to one embodiment of the invention.

More specifically, one embodiment operates according to the flowchart illustrated in FIG. 4. It should be noted that the particular steps described by the flowchart may be implemented in software, hardware or any combination thereof. For example, as mentioned above, the steps may be embodied within the wireless protocol supported by the baseband processor 320.

At 400, the device (or, rather, the baseband processor 320) initially detects the strength of the received signal. This may be accomplished, for example, by measuring the power of the received signal and selecting a particular RSSI value corresponding to the power measurement. Once the RSSI value is selected, at 405, the device identifies an initial power level at which to attempt to transmit. If the initial transmission is unsuccessful (e.g., no acknowledgement is received from the base station) then the device may attempt to transmit a predetermined number of additional times at the initial power level.

If the transmission is successful, determined at 410, then the initial power level is maintained. In one embodiment, however, if the RSSI changes above or below some threshold value and/or if a specified number of subsequent transmissions are unsuccessful, then the process set forth in the flowchart may be reinitiated.

At 410, if the device determines that the transmission attempts were unsuccessful, then, at 420, the transmission power level is increased by a predetermined amount (e.g., −3 dB). The device then attempts to transmit at the new power level one or more additional times, at 425. If the transmission is successful, determined at 430, then the increased power level is maintained at 435 (i.e., unless, as described above, the RSSI changes and/or a specified number of transmissions fail).

If the transmission attempts at the new power level are unsuccessful, then, at 440, the device determines whether it is currently transmitting at the maximum power level. If so, then at 445, it may continue to transmit at full power until the maximum number of retries (e.g., intra-dialog retries) have been exhausted and/or it may execute one or more additional techniques to make contact with the base station. At this stage it also may wait a specified period of time and then attempt to retransmit again. Various additional techniques may be employed to contact the base station while still complying with the underlying principles of the invention.

If the maximum power level has not been reached then, at 420, the power level may be increased again and the device attempts to transmit again, at 425. The device may continue to increase transmission power in this manner until either the transmission attempts are successful or the transmission attempts are unsuccessful but the maximum power level has been reached. In one embodiment, the exact number of repeated transmission attempts may be specified by the network and this maximum number of retransmissions is maintained, regardless of whether full power is reached.

One particular embodiment of the invention will now be described with respect to the graph in FIG. 5, which illustrates transmission power as a function of time. At t=0, the device selects an initial power level of −6 dB (i.e., at start point 500), based on the current RSSI value. The device makes N transmission attempts at this power level and, because all N attempts are unsuccessful, raises the power level to −3 dB, as indicated. The device then makes another M-N unsuccessful attempts and increases the power level once again to 0 dB, as indicated. The number of transmission attempts at the second power level (and subsequent levels) may be different from the number of initial attempts, depending on the embodiment (e.g., N may be greater than, less than or equal to M-N). Shortly after the second power level increase, the device successfully reaches the base station (at point 510) and continues to transmit at this final power level (i.e., 0 dB).

Figure 5:
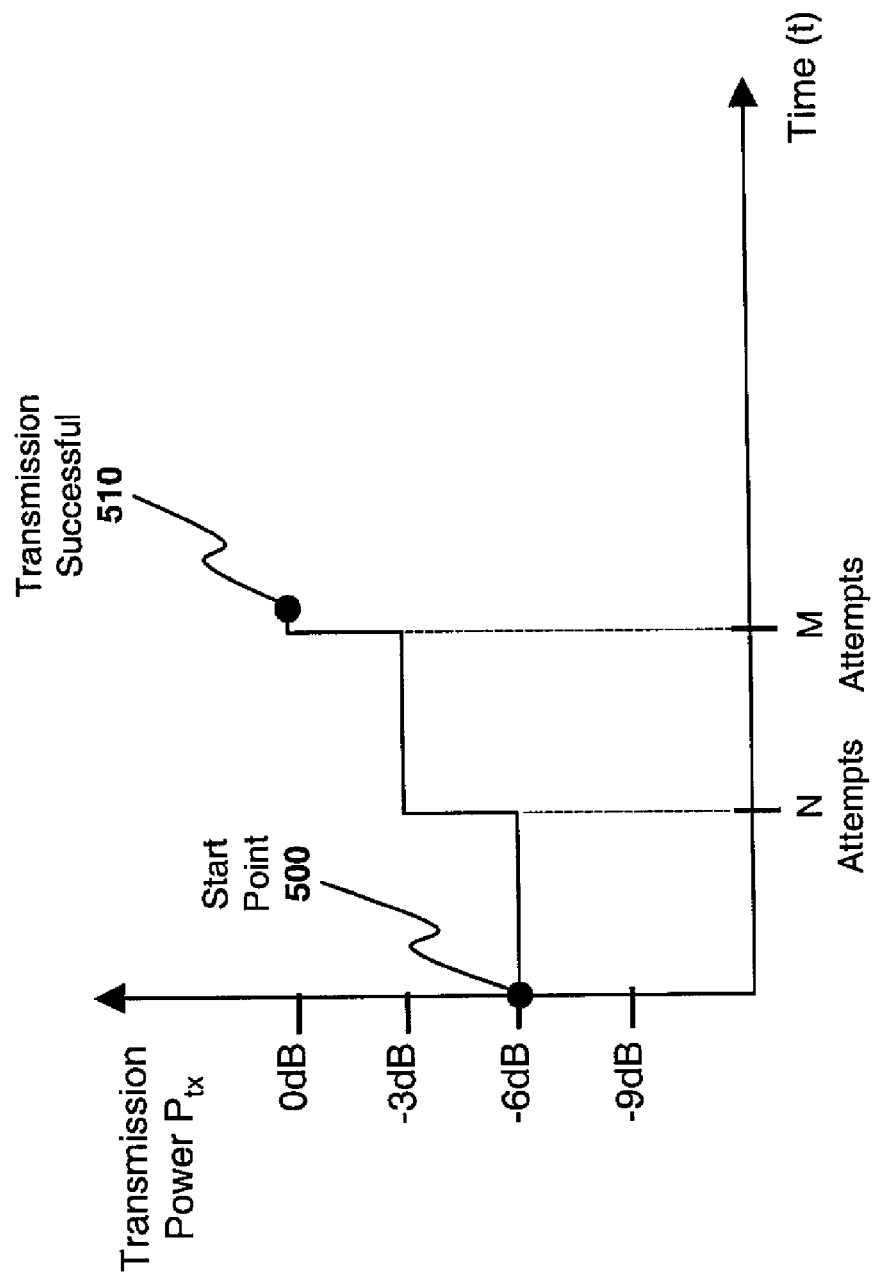
FIG. 5 illustrates power level over time according to one example of system operation.

Although illustrated in FIG. 5 as a system with four discrete power levels, it should be noted that various other power levels may be used while still complying with the underlying principles of the invention. For example, in one embodiment, only two power levels are used. The device may initially attempt to transmit at the lower power level (i.e., if the RSSI is above a specified threshold value) and may then move to the higher power level after a predetermined number of transmission attempts.

In one embodiment, certain types of data transmissions are initially attempted at a heightened power level, relative to the RSSI value. For example, certain short messages (e.g., below some specified size) such as acknowledgements or other types of control messages may be transmitted at a relatively high power level, even if the RSSI value is relatively strong. One reason for transmitting relatively short messages at a heightened power level is that, because they are short, these messages will not consume a significant amount of the device's battery power. As such, it may be more efficient to simply transmit these signals at a higher power level, thereby increasing the initial success rate, rather than initially attempting transmission at a lower power level and then potentially re-transmitting at the high power level.

In addition, in one embodiment, if the RSSI is above a certain threshold value, then transmission power level will not increase past a specified value (e.g., the highest transmission power level), thereby conserving battery power on the device (i.e., because jumping to the higher power level is probably unnecessary, given the high RSSI value). Moreover, this technique may reduce possible interference at the base station, which the device is presumably quite close to. In one embodiment, the device may jump to a higher power level, but only after significantly more transmission attempts have been made at the lower power levels.

Figure 6:
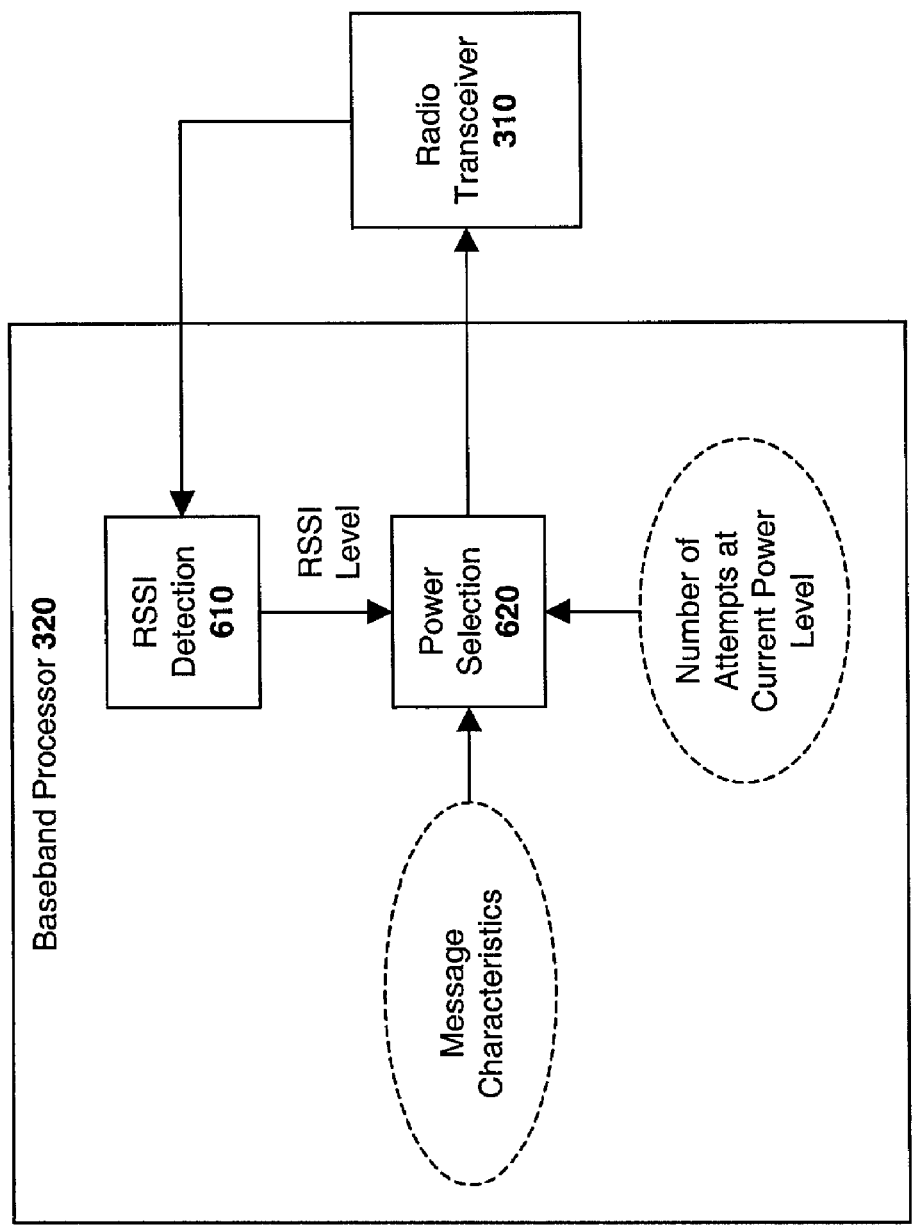
FIG. 6 illustrates power selection logic and signal detection logic according to one embodiment of the invention.

FIG. 6 illustrates one embodiment of the invention in which the power manipulation techniques described herein are embodied within the wireless device's baseband processor 320. Specifically, in this embodiment, a received signal strength detection module 610 continually monitors the strength of the received signal. The RSSI value (or other value based on the RSSI value) is read by a power selection module 620. Based on the initial RSSI reading, the power selection module 620 attempts to transmit at a particular power level. If unsuccessful, the number of attempts at each power level are continually monitored. When a threshold value is reached, the power selection module instructs the radio transceiver to begin transmitting at a relatively higher power level.

As indicated, in one embodiment, the power selection module 620 also factors in the characteristics of the message to be transmitted before selecting a particular power level (e.g., such as the message size and/or type). In one embodiment, the RSSI detection module 610 and power selection module 620 work together to perform the specific process set forth in FIG. 4.

Figure 8A:
FIGS. 8a-b illustrate signal timing between a mobile device and a base station according to one embodiment.

In one embodiment, the power selection module 620 maintains its heightened power level across multiple communication dialogs. A typical error-free dialogue from device (MOB) to base station (BAS) is illustrated in FIG. 8*a*, where:

ABD=may I transmit a packet to you?;
ATD=yes, you may;
MRM=the packet of data (e.g., containing the actual email or other message); and
ACK=thank you, I received it successfully.

These four different packets all constitute one "dialogue."

Figure 8B:
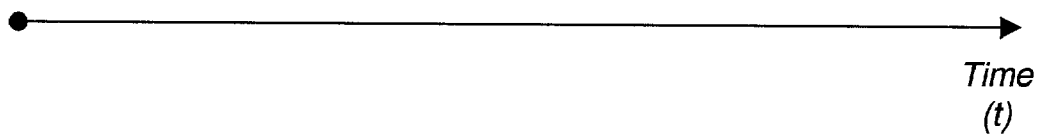

A dialog which contains errors is illustrated in FIG. 8*b*. Specifically, the base did not hear the wireless device's first access request (ABD) and the device did not hear the base station's initial response (ATD). In this example:

REB=Some of the data was in error, please repeat certain parts of it; and
RES=Here it is.

Once again, the whole sequence of multiple transmissions of different kinds constitute one dialogue, because they were all concerned with getting one packet of actual user data through (in the MRM+RES if necessary).

One embodiment of the power selection logic will not only increase power in the second example (e.g., after the second unsuccessful transmission to the base), but will maintain the heightened power level across multiple dialogs. In other words, rather than starting with the power level calculated from the standard output power algorithm (primarily based on RSSI), this embodiment, will start its next dialog following the dialog shown in FIG. 8*b* at the heightened power level. In one embodiment, the power level is preserved until there have been a predetermined number (e.g., three) consecutive successful dialogues or a predetermined amount of time has elapsed (e.g., a three minute timeout expires).

Power Reduction Embodiments

In one embodiment of the invention, both the Host subsystem 300 and the RF subsystem 301 may independently enter a low power or "sleep" mode, thereby conserving power in a more efficient, intelligent manner. For example, a user may not need to transmit/receive data for extended periods of time but, during the same periods, may need to run various applications on the wireless device (e.g., text editing applications such as offline email composition and word processing, audio recording applications, . . . etc). Accordingly, during these periods of time, the RF subsystem 301 may operate in a low power mode while the Host subsystem 300 operates in a standard power mode. Conversely, at certain times the user may want to remain in contact with the network but may not need to run applications on the device. As such, during these periods, the Host subsystem 300 may enter a low power mode but the RF subsystem 301 may operate at standard power. Finally, both the Host subsystem 300 and the RF subsystem 301 may operate in a low power mode under certain conditions (e.g., the device is out of range and the user is not running applications).

Figure 7:
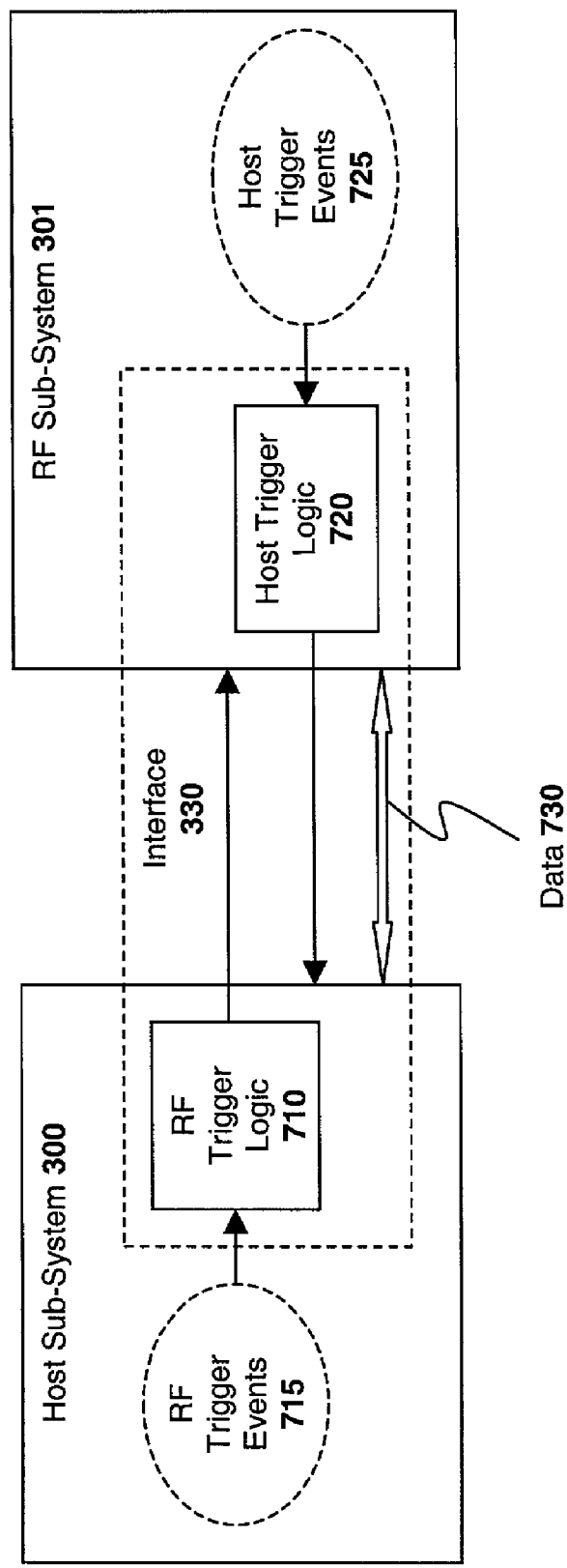
FIG. 7 illustrates logic for waking the Host processor and/or a baseband processor according to one embodiment of the invention.

In one embodiment, illustrated in FIG. 7, the RF subsystem 301 includes Host trigger logic 720 for waking the Host subsystem 300 in response to one or more Host trigger events 725. Conversely, the Host subsystem 300 includes RF trigger logic 710 for waking the RF subsystem in response to one of more RF trigger events 715.

For example, one particular RF trigger event 715 may be that the Host subsystem 300 needs to transmit data 730 over the network. In response to this RF trigger event 715, the RF trigger logic 710 sends a control signal to the RF subsystem 301 indicating that it needs to exit low power mode (i.e., if it is currently in a low power mode) so that it may transmit the data. Similarly, one particular Host trigger event may include the RF subsystem 301 receiving data 730 which must be transmitted to the Host processor and memory 335. In this case, the Host trigger logic 720 signals to the Host subsystem 300 to exit low power mode so that it can receive/process the data. In one embodiment, buffers may be configured on both the Host subsystem 300 and the RF subsystem 301 to buffer data while waiting for the RF subsystem 301 and/or the Host subsystem 300, respectively, to exit low power mode. Various other trigger events may be programmed to wake either the Host subsystem 300 or the RF subsystem 301 while still complying with the underlying principles of the invention (many of which are described in detail below).

In one embodiment of the invention, there are four primary RF subsystem 301 states and three distinct levels of RF subsystem 301 power consumption. Throughout the following description, reference is made to the term Mobitex ASynchronous Communications ("MASC"), which is the serial link communications protocol used by both the Host subsystem 300 and the RF subsystem 301 to communicate commands and frames of information to each other. In addition, the embodiments below are described primarily in the context of the Mobitex network and protocol, system release R4A. However, it should be noted that the underlying principles of the invention are not limited to any particular network type or protocol.

RF Subsystem States

Figure 9A:
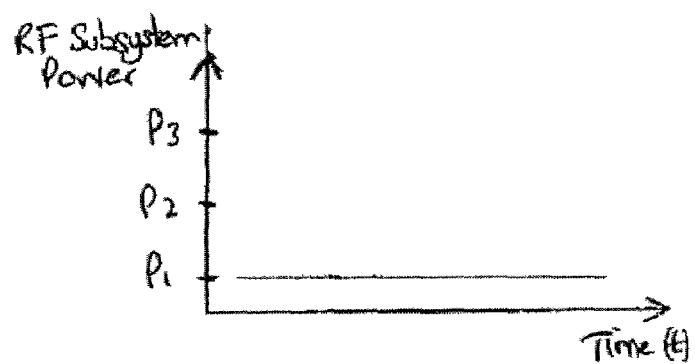

1. Shutdown. The RF subsystem 301, including both the baseband processor 320 and Radio Transceiver 310 are permanently in the low power state. The RF subsystem 301 is conceptually off. The Host subsystem 300 normally orders the RF subsystem 301 into this state by issuing the MASC shutdown command. However, in one embodiment, the RF subsystem 301 may enter the Shutdown state of it's own accord, without explicit instructions from the Host. In one embodiment, however, the RF subsystem 301 cannot bring itself out of the Shutdown state. Only the Host subsystem 300 can cause the RF subsystem 301 to leave the Shutdown state (i.e., turn on). FIG. 9*a* illustrates the power consumption of the RF subsystem 301 in the Shutdown state.

Figure 9B:
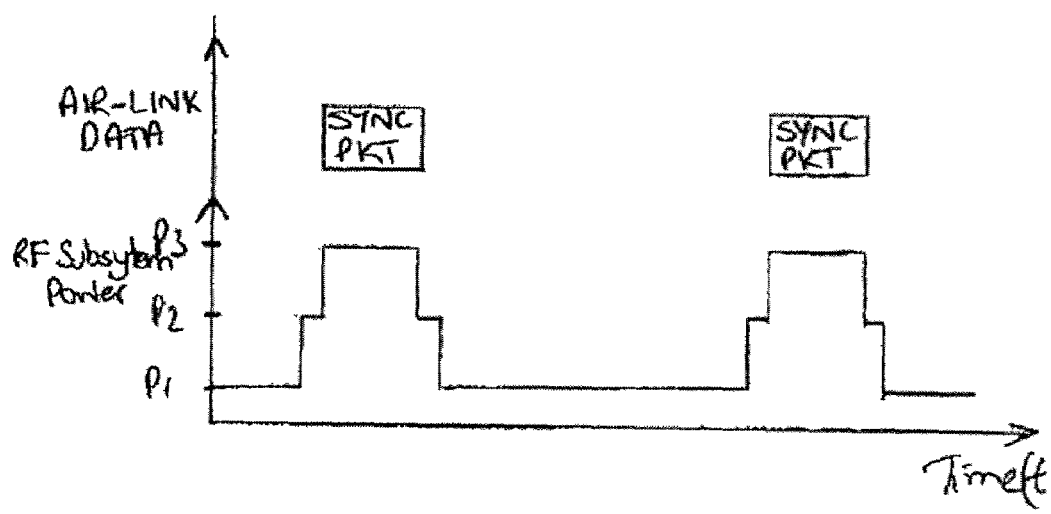

2. In Base Station Coverage. The RF subsystem 301 considers itself to be in contact with a Mobitex Base Station. While in this state the RF subsystem 300 will transition between three different levels of power consumption in accordance with two main criteria: (i) maintaining synchronization and proper communication with the Base Station in all manner defined by the Mobitex protocol revision R4A (e.g., waking periodically to receive a synchronization packet and reading the list of devices which have messages waiting) and (ii) in response to RF Trigger Logic 710 events, explained in further detail below. FIG. 9*b* is a representation of the RF subsystem 301 transitioning between the three power levels, P1, P2, and P3, while maintaining synchronization with the wireless network.

Figure 9C:
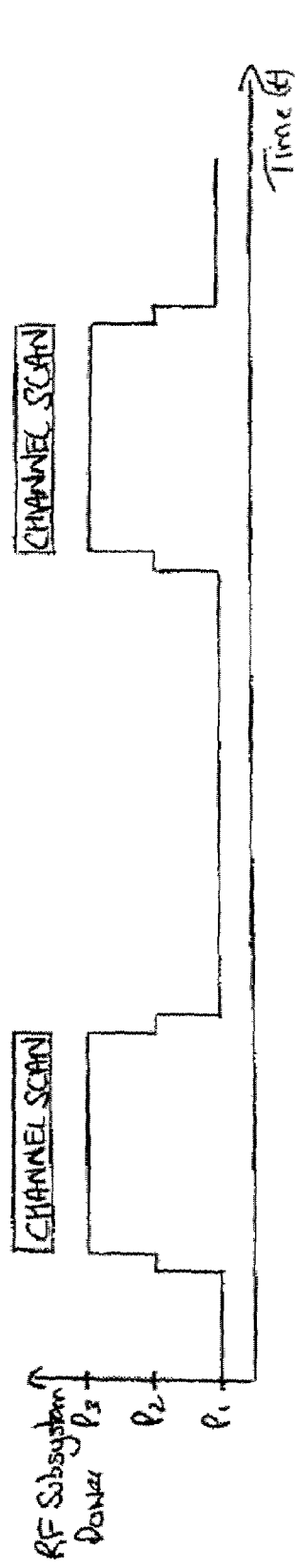

3. Not in Base Station Coverage. The RF subsystem 301 is searching for a Mobitex Base Station. While in this state the RF subsystem will transition between three different levels of power consumption in accordance with two main criteria: (i) attempting to achieve Base Station contact and (ii) in response to RF Trigger Logic 710 events, explained in further detail below. FIG. 9*c* illustrates the RF subsystem 301 transitioning between the three power levels described above while attempting to make network contact (i.e., by powering up the baseband processor 320, followed by the RF transceiver 310 and then performing a channel scan).

Figure 9D:
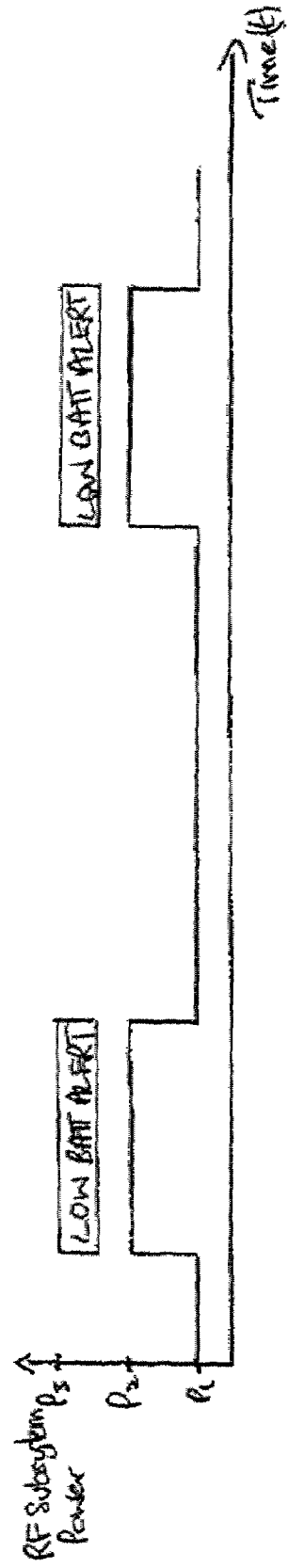

4. Low Batteries. The RF subsystem 301 is unable to sustain reliable operation of the Radio Transceiver 310 due to insufficient battery capacity. The Radio Transceiver 310 enters and remains in its low power state. The RF subsystem 301 therefore transitions between two different levels of power consumption in accordance with two criteria: (i) periodic notification of the low battery condition to the Host 335 as required by the Mobitex protocol and (ii) in response to RF Trigger Logic 710 events, explained in further detail below. FIG. 9*d* shows the RF subsystem transitioning between the two power levels, P1 and P2, while periodically notifying the Host 335 of the low battery condition.

In sum, the three levels of power consumption the RF subsystem 301 transitions between, as illustrated in FIGS. 9*a* through 9*d*, are defined as follows:

P1: Both the Baseband processor 320 and Radio Transceiver 310 are in the low power state.

P2: The Baseband processor 320 is consuming standard operating power. The Radio Transceiver 310 is in the low power state.

P3: Both the Baseband processor 310 and Radio Transceiver 320 are consuming standard operating power.

Host Subsystem States

Generally, the state of the Host subsystem 300 is application and user dependent. The Host 300 may be idle in the lowest power state or consuming various operating powers.

Host Trigger Logic 720 events from the RF subsystem 301 will force the Host 300 into a state and level of power consumption necessary, at least, to carry out MASC serial communications with the RF subsystem 301. This communication may then, in turn, lead to any kind of behavior appropriate for the information communicated.

Interface 330 Signals

A side-effect of the low power state the Host 300 and RF subsystems 301 can enter is that serial communications between the two are not available.

To coordinate MASC communications with the Host 300 and RF subsystem 301 low power states, two primary hardware interface signals are used, referred to herein as 'Host-Ready' and 'RF-Ready.'

Interface Signal Overview

1. Host-Ready. When the Host subsystem 300 wants to either (i) communicate with the RF subsystem 301 or (ii) acknowledge that the RF subsystem 301 has requested communications with the Host, it asserts the Host-Ready signal. When the Host subsystem 300 has finished its communications with the RF subsystem 301 and has no reason to believe that further communications from the RF subsystem 301 are imminent, it permits the RF subsystem 301 to enter its lowest power state by de-asserting the Host-Ready signal. The RF subsystem 301 considers this to be an indication that the Host subsystem 300 no longer requires MASC communications. In one embodiment, the RF subsystem 301 must still comply with its Mobitex responsibilities before it can enter its lowest power level, P1.

2. RF-Ready. When the RF subsystem 301 wants to either (i) communicate with the Host subsystem 300 or (ii) acknowledge that the Host subsystem 300 has requested communication with the RF subsystem 301, it asserts RF-Ready. When the RF subsystem 301 has detected that the Host subsystem 300 has given it permission to enter its low power state (i.e., Host-Ready is de-asserted), it de-asserts RF-Ready. This confirmation ensures that trigger events are not missed.

Interface Signal Specifics

Initial Conditions.

In one embodiment, Host-Ready and RF-Ready are de-asserted by default. FIG. 9e shows both signals de-asserted.

Host to RF Subsystem Communications.

Assuming the initial conditions stated above, when the Host subsystem 300 wants to communicate with the RF subsystem 301 it asserts the Host-Ready signal. It must then wait for the RF-subsystem 300 to acknowledge that it is ready to proceed (i.e., for the RF subsystem to assert RF-Ready). This may take a variable amount of time, depending on what the RF subsystem 300 was doing at the time Host-Ready was asserted. If the RF subsystem 300 happened to be synchronizing with the network (power level P3) it will respond quickly (e.g., 600 microseconds), if it was in its lowest power state P1 it may take more time (e.g., up to 2 seconds) to awaken.

After the Host subsystem 300 detects that RF-Ready has been asserted, it may then proceed with MASC communications. For example it may send a frame of data for the RF subsystem 301 to transmit to the base station, or it may request state information from the RF subsystem 301, for example, RSSI (signal strength) or battery level information.

Note that when the Host 300 asserts Host-Ready, the RF subsystem 301 may be in any of the four primary RF subsystem 301 states. If the RF subsystem 301 was in the Shutdown state, it will emit a special MASC initialization frame immediately after it asserts RF-Ready. It is by this mechanism that the Host subsystem 300 is informed that the RF subsystem 301 had previously been Shutdown.

When the Host subsystem 300 has successfully delivered its MASC communications and received a response if applicable, the Host subsystem 300 de-asserts Host-Ready to indicate it has finished communicating thereby allowing the RF subsystem 301 to enter low power level P1 when possible.

When the RF subsystem 301 detects that Host-Ready has been de-asserted, it will de-assert RF-Ready. The Host subsystem must wait for this confirmation before it next asserts Host-Ready. In one embodiment, it takes less than 100 milliseconds for the RF subsystem 301 to de-assert RF-Ready in response to a de-asserted Host-Ready.

FIG. 9f illustrates one embodiment of the Host subsystem 300 asking the RF subsystem 301 for a parameter value. Note that no transmissions from the RF subsystem 301 to the base station are required, so the RF subsystem 301 transitions only from power level P1 to P2 (i.e., the radio transceiver 310 never turns on).

Figure 9G:
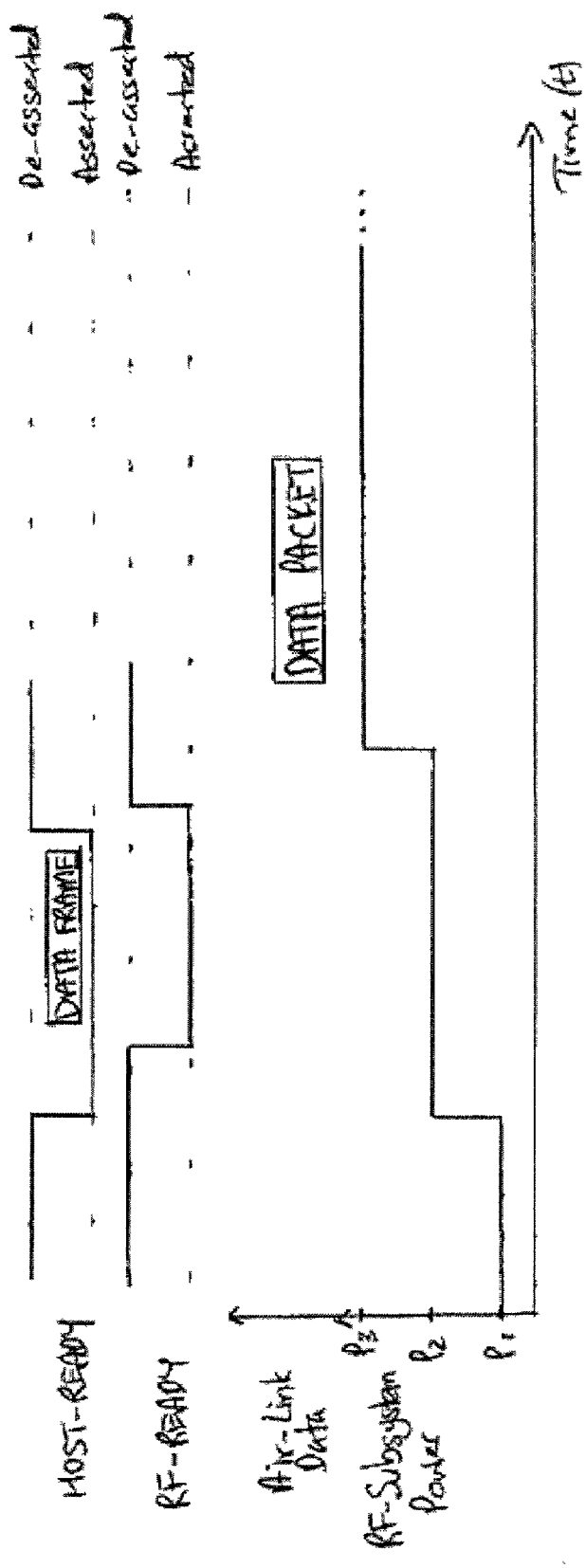

FIG. 9g shows the Host subsystem 300 sending a data frame to the RF subsystem 301 for transmission to the base station. As indicated, under these conditions, the RF subsystem 301 must transition to power level P3.

RF to Host Subsystem Communications.

Assuming the initial conditions stated above, when the RF subsystem 301 requires MASC communications with the Host subsystem 300 it asserts RF-Ready. Then it must wait for the Host subsystem 300 to acknowledge that it is ready to proceed (i.e., it waits for the Host subsystem to assert Host-Ready).

After the RF subsystem 301 detects that Host-Ready has been asserted, it may then proceed with MASC communications. For example, it may have a packet of data from the base station to deliver to the Host subsystem 300.

After the information has been successfully communicated to the Host subsystem 300, the RF subsystem 301 does nothing. It is the responsibility of the Host subsystem 300 to de-assert Host-Ready when it thinks no further communications are likely.

Figure 9H:
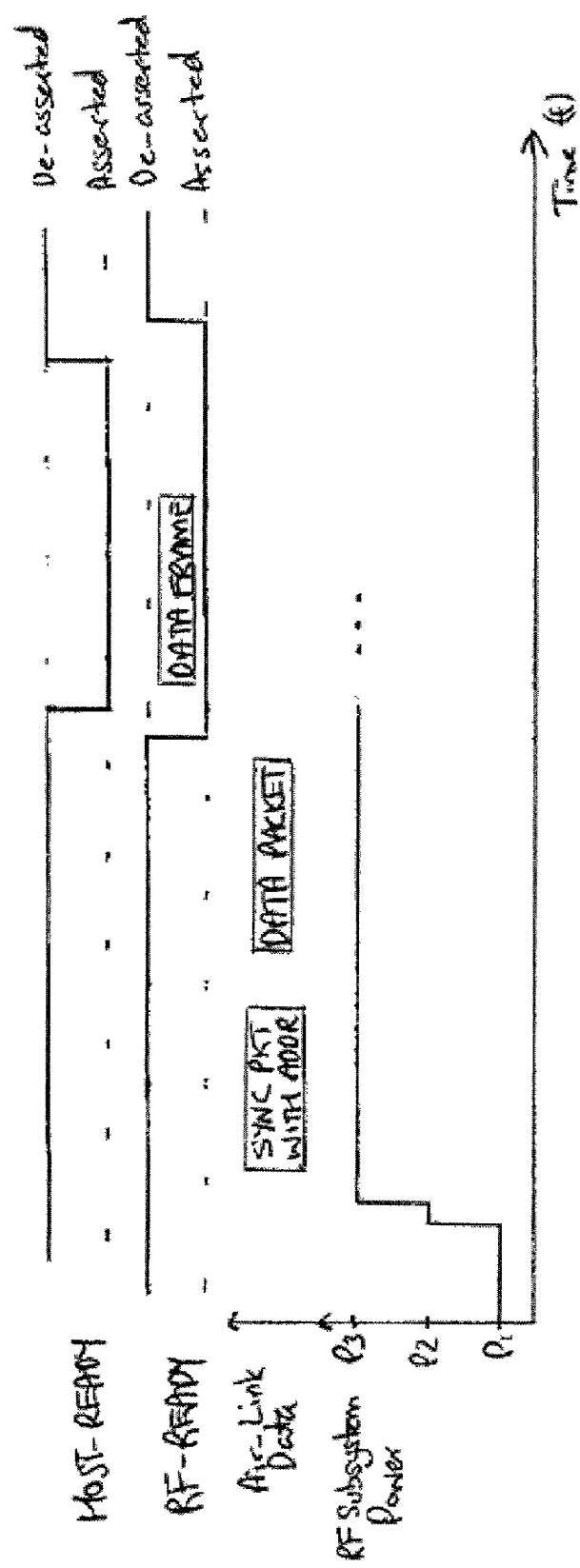

FIG. 9h shows one embodiment of the RF subsystem 301 receiving a packet of data from the network and waking the Host subsystem 300 to forward the data to it. If the Host subsystem 300 does not acknowledge the RF subsystem's 301's assertion of RF-Ready, the RF subsystem 301 waits for up to 2 seconds for the Host to assert Host-Ready. In one embodiment, if Host-Ready has not asserted by that time, the RF subsystem 300 toggles (i.e., de-asserts and then re-asserts) the RF-Ready signal. In one embodiment, RF-Ready is asserted up to 3 times before the RF subsystem 301 gives up and de-asserts RF-Ready.

If the RF subsystem 301 cannot get the host subsystem's 300's attention, the information the RF subsystem 301 had for the Host subsystem 300 is either buffered or discarded if it cannot get the Host's 300's attention. In one embodiment, up to six maximum length data packets from the network are buffered. Of course, various amounts of buffering may be used while still complying with the underlying principles of the invention. The RF subsystem 301 attempts to wake the Host for each data packet that is received. In one embodiment, if six data packets are received without the Host subsystem 300 responding, the RF subsystem 301 enters the Shutdown state, saving the data packets for when the Host subsystem 300 next asserts Host-Ready.

Figure 9I:
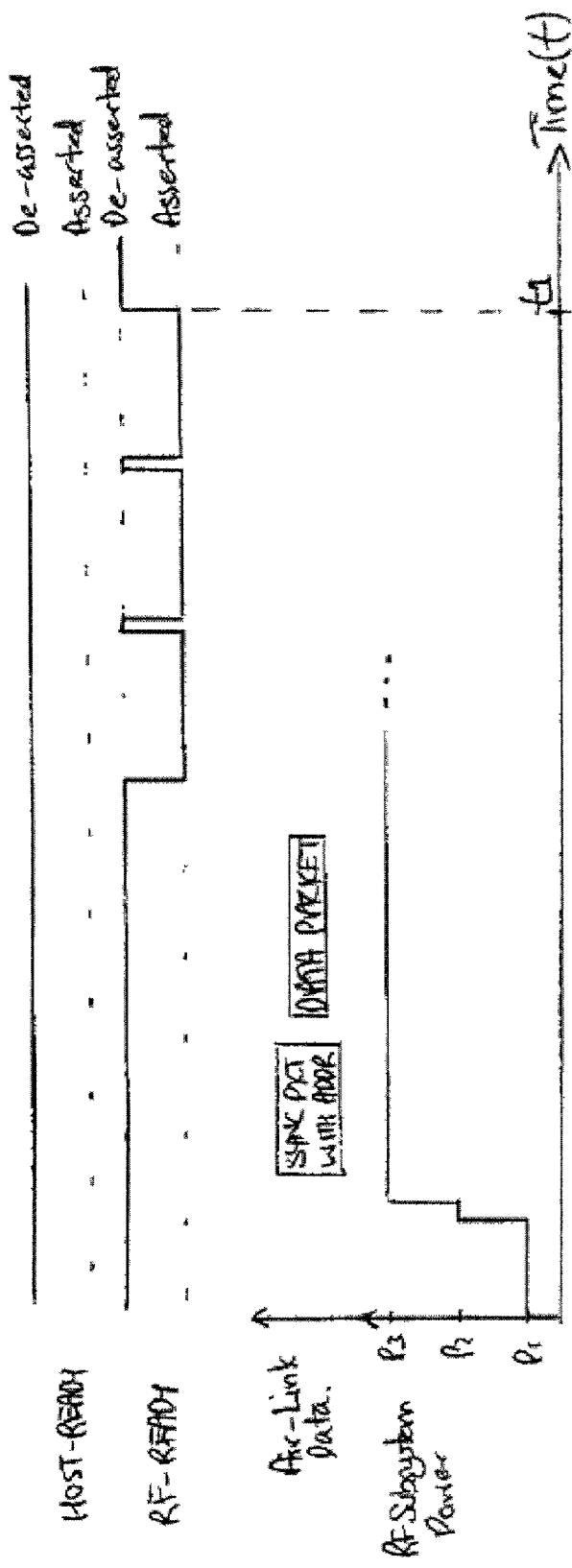

FIG. 9i shows one embodiment of the RF subsystem 301 attempting to get the attention of the Host subsystem 300, which is not responding. At t1, the RF subsystem gives up and the data packet is buffered.

In addition, in one embodiment, if the RF subsystem 301 is attempting to Shutdown, attempting to notify the Host subsystem 300 of a low battery condition or a MASC error condition, or is attempting to send a MASC initialization frame (e.g., sent when the RF subsystem 301 leaves the Shutdown state) and the Host subsystem 300 does not respond, the RF subsystem 301 discards the information and enters the Shutdown state.

In one embodiment of the invention, for any type of MASC communication other than data packets and other than the special cases mentioned in the previous paragraph, the information is discarded, but the RF subsystem 301 does not shutdown.

To conserve power, certain notification events may be suppressed if Host-Ready is de-asserted at the time the events are generated. That is, the Host is not awakened if the events occur. These events may include, for example: (i) contact has been established with a base station, (ii) base station contact has been lost, and (iii) RF subsystem 301 has roamed (i.e., changed from one base station to another). Of course, suppression of events is not required for complying with the underlying principles of the invention.

Auto-RSSI Updates

The Host may request RSSI updates periodically. Alternatively, in one embodiment, the RF subsystem automatically sends unsolicited RSSI reports to the Host whenever the RSSI actually changes. It may do so at some specified frequency and/or with some minimum report threshold (e.g., at no less then 10 second intervals).

One of the benefits of using an unsolicited RSSI update approach is that it may achieve an optimal balance between the most accurate user-interface signal strength indication while saving the most power, particularly in a dual-processor system where each subsystem may enter low power modes independently of the other. Power is saved because the Host does not have to wake to ask for an RSSI update that could possibly be the same as the previous update. In one embodiment, the automatic update from the RF subsystem is tied to the timing of the network synchronization points that it wakes up for. Therefore there is virtually no reduction of RF subsystem "sleep" time, the update is most timely because the time period between synchronization points does change and the Host need not concern itself with any of these details.

Interface Signal Race Conditions

Figure 9J:
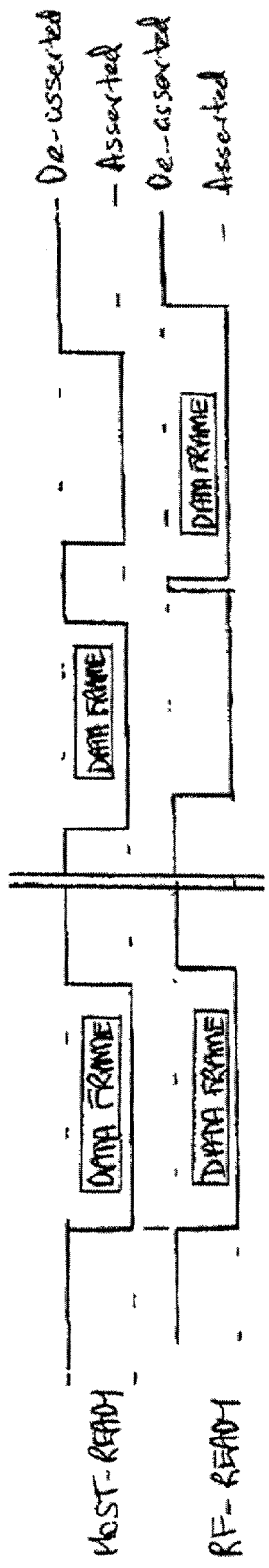

Neither the Host subsystem 300 nor the RF subsystem 301 will malfunction in the event that Host-Ready and RF-Ready are asserted at precisely the same time as illustrated in the left half of FIG. 9*j*. In this embodiment, it is not possible for Host-Ready and RF-Ready to de-assert simultaneously because RF-Ready de-asserts in response to Host-Ready de-asserting.

In one embodiment, during the window of time (<100 ms) after the Host subsystem 300 has de-asserted Host-Ready but before the RF subsystem 301 has acknowledged this by de-asserting RF-Ready, the RF subsystem 301 may suddenly have more information to send to the Host subsystem 300. Since RF-Ready is already low, the RF subsystem initially toggles, that is, de-asserts then asserts RF-Ready as shown in the right half of FIG. 9*j*.

Low Power Base Station Scanning

Figure 9K:
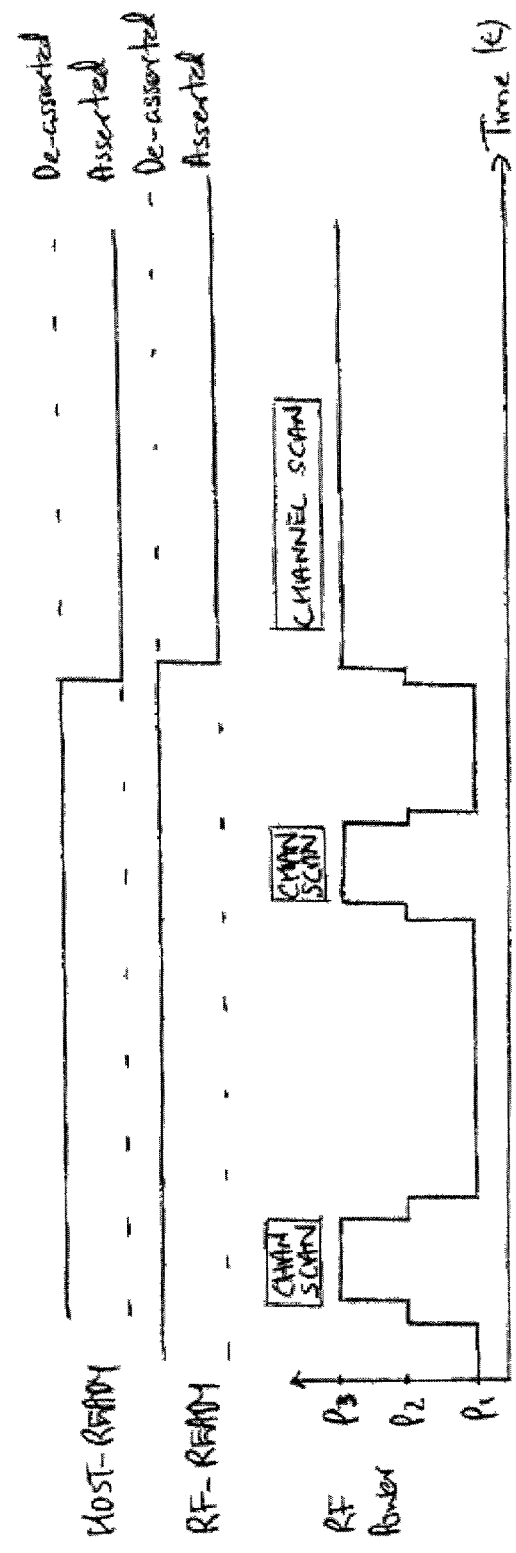

When the RF subsystem 301 is not in base station coverage, it is constantly searching for a useable base station if Host-Ready is asserted. If the Host-Ready signal is de-asserted, the RF subsystem 301 enters low power level P1 but periodically awakens to scan for base stations. In one embodiment, it scans for 10% of the time and enters low power mode 90% of the time. If Host-Ready is asserted the RF subsystem 301 begins and remains scanning continuously until Host-Ready is de-asserted again as illustrated in FIG. 9*k*.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while described above in the context of a specific network architecture (i.e., the Mobitex network), the underlying principles of the invention may be implemented in virtually any network environment. Similarly, various different client architectures may be employed other than the specific embodiment illustrated in FIG. 3.

In addition, as mentioned above, all of the functions and modules described herein may be implemented in software (e.g., and executed on a general purpose processor), hardware (e.g., such as an application specific integrated circuit ("ASIC")), or any combination thereof.

It is also important to note that the apparatus and method described herein may be implemented in environments other than a physical integrated circuit ("IC"). For example, the circuitry may be incorporated into a format or machine-readable medium for use within a software tool for designing a semiconductor IC. Examples of such formats and/or media include, but are not limited to, computer readable media having a VHSIC Hardware Description Language ("VHDL") description, a Register Transfer Level ("RTL") netlist, and/or a GDSII description with suitable information corresponding to the described apparatus and method.

Accordingly, the scope and spirit of the invention should be judged in terms of the claims which follow.

What is claimed is:

1. A method implemented on a wireless device comprising:

determining strength of a received signal;

determining a type of a message to be embodied in said signal transmission attempt;

selecting a first power level for a signal transmission attempt based on said strength of said received signal and based on said type of message;

determining if the signal transmission attempt is successful; and increasing said first power level to a second power level if a predetermined number of signal transmission attempts at said first power level are unsuccessful.

2. The method as in claim 1 wherein increasing further comprises:

maintaining said second power level across one or more communication dialogs.

3. The method as in claim 1 further comprising:
increasing said second power level to a third power level within said first communication dialog if a signal transmission attempt at said second power level is unsuccessful; and
maintaining said third power level across one or more additional communication dialogs.

4. The method as in claim 3 wherein increasing further comprises:
increasing said second power level to a third power level if a predetermined number of signal transmission attempts at said second power level are unsuccessful.

5. The method as in claim 1 wherein said message is an acknowledgement message.

6. The method as in claim 3 wherein said third power level is a maximum power level at which said wireless device can transmit, further comprising:
attempting to transmit said signal a threshold maximum number of times at said maximum power level.

7. A wireless apparatus comprising:
signal strength detection logic to determine strength of a received signal;
power level selection logic to select a first power level for a signal transmission attempt based on said strength of said received signal and based on a type of a message to be transmitted, said power level selection logic increasing said first power level to a second power level if said signal transmission attempt is unsuccessful; and
said power level selection logic maintaining said second power level across one or more communication dialogs.

8. The apparatus as in claim 7 wherein said power selection logic increases said first power level to a second power level if a predetermined number of signal transmission attempts at said first power level are unsuccessful.

9. The apparatus as in claim 7 wherein said power selection logic increases said second power level to a third power level if a signal transmission attempt at said second power level is unsuccessful, and maintains said third power level across one or more additional communication dialogs.

10. The apparatus as in claim 9 wherein said power selection logic increases said second power level to a third power level if a predetermined number of signal transmission attempts at said second power level are unsuccessful.

11. The apparatus as in claim 10 wherein said power selection logic:
determines a type of a message to be embodied in said signal transmission attempt; and
initially attempts to transmit said signal at said second or third power levels if said message is of a specified type.

12. The apparatus as in claim 11 wherein said message type is an acknowledgement.

13. The apparatus as in claim 9 wherein said third power level is a maximum power level at which said wireless device can transmit, and wherein said power selection logic:
attempts to transmit said signal a threshold maximum number of times at said maximum power level.

* * * * *